US010618062B2

(12) United States Patent
Nakamura et al.

(10) Patent No.: US 10,618,062 B2
(45) Date of Patent: Apr. 14, 2020

(54) FLUID DISCHARGE APPARATUS

(71) Applicant: Seiko Epson Corporation, Tokyo (JP)

(72) Inventors: Shinichi Nakamura, Okaya (JP); Takahiro Katakura, Okaya (JP); Keigo Sugai, Chino (JP); Hirofumi Sakai, Shiojiri (JP); Junichi Sano, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/830,293

(22) Filed: Dec. 4, 2017

(65) Prior Publication Data

US 2018/0178224 A1 Jun. 28, 2018

(30) Foreign Application Priority Data

Dec. 28, 2016 (JP) .................... 2016-254734

(51) Int. Cl.
*B05B 1/08* (2006.01)
*B41J 2/14* (2006.01)
*B05B 17/06* (2006.01)
*B41J 2/04* (2006.01)
*B29C 64/106* (2017.01)
*B33Y 30/00* (2015.01)
(Continued)

(52) U.S. Cl.
CPC .......... *B05B 1/086* (2013.01); *B05B 17/0607* (2013.01); *B29C 64/00* (2017.08); *B29C 64/106* (2017.08); *B29C 64/209* (2017.08); *B33Y 30/00* (2014.12); *B41J 2/04* (2013.01); *B41J 2/14201* (2013.01); *B41J 2202/05* (2013.01)

(58) Field of Classification Search
CPC .................................. B05B 1/086; B41J 2/04
See application file for complete search history.

(56) References Cited

U.S. PATENT DOCUMENTS 5,636,788 A 6/1997 Wilson
2002/0025260 A1 2/2002 Maruyama
(Continued)

FOREIGN PATENT DOCUMENTS

CN 101 674 892 A 3/2010
JP 09-500949 A 1/1997
(Continued)

*Primary Examiner* — J C Jacyna
(74) *Attorney, Agent, or Firm* — Harness, Dickey & Pierce, P.L.C.

(57) ABSTRACT

A fluid discharge apparatus includes a storage chamber, a moving body, a drive mechanism, and a coupling member. The storage chamber includes a discharge port to discharge the fluid. The moving body includes a leading end portion facing the discharge port inside the storage chamber. The drive mechanism is positioned on the opposite side of the moving body to the discharge port, and performs an operation to reciprocate the moving body. The coupling member couples the moving body to the drive mechanism such that the moving body is attachable and detachable. The coupling member includes a biasing section to apply an elastic force in a direction to move the moving body toward the drive mechanism, and, while pressing the moving body against the coupling member, to support the moving body in a state in which the moving body is capable of elastic displacement in a direction toward the discharge port.

7 Claims, 4 Drawing Sheets

(51) Int. Cl.
*B29C 64/00* (2017.01)
*B29C 64/209* (2017.01)

(56) References Cited

U.S. PATENT DOCUMENTS

| | | | | |
|---|---|---|---|---|
| 2008/0086077 | A1* | 4/2008 | Seto | A61B 17/3203 604/48 |
| 2010/0001101 | A1* | 1/2010 | Leuteritz | B05B 1/083 239/533.3 |
| 2010/0156970 | A1 | 6/2010 | Ikushima | |
| 2010/0294810 | A1* | 11/2010 | Ikushima | B05C 5/0237 222/309 |
| 2012/0105522 | A1* | 5/2012 | Wallsten | B41J 2/04 347/9 |
| 2013/0233891 | A1 | 9/2013 | Ikushima | |
| 2015/0316172 | A1* | 11/2015 | Bustgens | F16K 99/0048 137/487.5 |
| 2018/0178533 | A1* | 6/2018 | Sakai | B41J 2/175 |

FOREIGN PATENT DOCUMENTS

| | | |
|---|---|---|
| JP | 10-227367 A | 8/1998 |
| JP | 2002-021715 A | 1/2002 |
| JP | 4786433 B2 | 10/2011 |
| JP | 2011-230122 A | 11/2011 |
| WO | WO-2008-146464 A1 | 12/2008 |

* cited by examiner

FLUID DISCHARGE APPARATUS

BACKGROUND

1. Technical Field

The present invention relates to a fluid discharge apparatus.

2. Related Art

Various fluid discharge apparatuses that discharge a fluid through a discharge port have been proposed. For example, JP-A-2011-230122 describes a liquid droplet ejecting apparatus that ejects an ejection liquid through an ejection port, this being a discharge port, by to-and-fro movement of a plunger, this being a moving body, in a liquid chamber, this being a storage chamber. Fluid discharge mechanisms employing such a to-and-fro action of a moving body may be applied to ink jet printers that discharge ink in order to produce printed material, and to three-dimensional formation apparatuses that discharge a liquid material in order to form three-dimensional objects.

In fluid discharge apparatuses including a moving body, such as that described above, sometimes the moving body is exchanged for maintenance or to make adjustments. It is desirable that such a moving body be simple to attach and detach from the perspective of such operations to exchange the moving body. Moreover, it is also desirable to suppress positional offset between the discharge port and the moving body after attaching and detaching when exchanging the moving body.

In JP-A-2011-230122, the plunger is configured so as to be attachable and detachable with respect to a coupling arm. However, in JP-A-2011-230122, no particular consideration is given to simplifying a plunger exchange operation or to suppressing positional offset of the plunger. There is thus still room for improvement with regard to configurations for attaching and detaching components in fluid discharge apparatuses.

SUMMARY

An advantage of some aspects of the invention is that at least some of the above issues are addressed. The invention may be implemented by the following configurations.

1.

One aspect of the invention provides a fluid discharge apparatus. The fluid discharge apparatus includes a storage chamber, a moving body, a drive mechanism, and a coupling member. The storage chamber stores a fluid. The storage chamber includes a discharge port to discharge the fluid. The moving body includes a leading end portion facing the discharge port inside the storage chamber. The moving body moves in a direction away from the discharge port and moves in a direction toward the discharge port so as to cause the fluid to flow out through the discharge port. The drive mechanism is positioned on the opposite side of the moving body to the discharge port, and performs an operation to pull the moving body so as to move the leading end portion away from the discharge port and an operation to push the moving body so as to move the leading end portion toward the discharge port. The coupling member couples the moving body to the drive mechanism such that the moving body is attachable and detachable. The coupling member includes a biasing section to apply an elastic force in a direction to move the moving body toward the drive mechanism, and, while pressing the moving body against the coupling member, to support the moving body in a state in which the moving body is capable of elastic displacement in a direction toward the discharge port.

In this fluid discharge apparatus, attachment and detachment of the moving body to and from the coupling member is simplified due to the elastic deformation of the biasing section.

2.

The fluid discharge apparatus may be configured such that the leading end portion of the moving body is on a central axis of the moving body and the moving body further includes a trailing end portion positioned on the central axis on an opposite side to the leading end portion. Configuration may be made such that the biasing section applies the elastic force to the trailing end portion, and the coupling member retains the moving body in a state in which the leading end portion undergoes elastic displacement in a direction intersecting the central axis by elastic deformation of the biasing section.

In this fluid discharge apparatus, the elastic force of the biasing section is used to adjust the position of the leading end portion of the moving body with respect to discharge port, enabling positioning error between the discharge port and the leading end portion of the moving body to be absorbed.

3.

The fluid discharge apparatus may be configured such that the leading end portion of the moving body closes off the discharge port when the moving body has moved toward the discharge port.

In this fluid discharge apparatus, the leading end portion of the moving body undergoes elastic displacement so as to close off the discharge port even in cases in which positioning error has arisen between the discharge port and the moving body, thereby suppressing the occurrence of issues caused by positioning error of the moving body.

4.

The fluid discharge apparatus may be configured such that the trailing end portion includes an overhang portion that juts out in a direction intersecting the central axis, and the biasing section applies the elastic force to the overhang portion.

This fluid discharge apparatus enables elastic force to be applied to the moving body by the biasing section in a simple configuration.

5.

The fluid discharge apparatus may be configured such that a face of the overhang portion that faces the coupling member includes a location in local contact with the coupling member.

In this fluid discharge apparatus, the elastic force of the biasing section promotes positional adjustment of the moving body, further suppressing the occurrence of issues caused by positional offset of the leading end portion of the moving body with respect to the discharge port.

6.

The fluid discharge apparatus may be configured such that the overhang portion includes an abutting portion projecting toward the coupling member from the face facing the coupling member, and the coupling member is in local contact with the overhang portion at the abutting portion.

This fluid discharge apparatus further promotes positional adjustment of the central axis of the moving body using the elastic force of the biasing section.

7.

The fluid discharge apparatus may be configured such that the coupling member includes a projection projecting toward the overhang portion and in local contact with the overhang portion.

This fluid discharge apparatus further promotes positional adjustment of the central axis of the moving body using the elastic force of the biasing section.

8.

The fluid discharge apparatus may be configured such that the drive mechanism includes a piezoelectric element that deforms so as to extend and contract along the central axis in response to electric drive force, and the piezoelectric element pulls and moves the moving body by contracting under the electric drive force, and pushes and moves the moving body by extending under the electric drive force.

This fluid discharge apparatus enables a biasing member to apply the piezoelectric element with external force in order to move the moving body in a direction away from the discharge port to be omitted. This enables drive force resulting from extension of the piezoelectric element in order to move the moving body in a direction toward the discharge port to be suppressed from being cancelled out by such a biasing member.

9.

The fluid discharge apparatus may be configured such that the drive mechanism includes a membranous support member that is disposed in a state applying pressure to the piezoelectric element between the piezoelectric element and the coupling member, and that flexes together with extension and contraction of the piezoelectric element.

In this fluid discharge apparatus, the piezoelectric element is suppressed from extending beyond its limit by the support member when deforming so as to extend. Protection of the piezoelectric element is thereby enhanced.

The plural configuration elements included in the configurations of the invention described above are not all essential, and appropriate modifications, omissions, substitution with new configuration elements, or omission of some limitations may be made to some of the plural configuration elements in order to address some or all of the issues described above, or to achieve some or all of the advantageous effects described in the present specification. Moreover, some or all of the technical features included in one configuration of the invention as described above may be combined with some or all of the technical features included in another configuration of the invention as described above so as to configure another independent configuration of the invention to in order to address some or all of the issues described above, or to achieve some or all of the advantageous effects described in the present specification.

The invention may be implemented by various configurations other than a fluid discharge apparatus. For example, the invention may be implemented by a head that discharges a fluid, an attachment structure for a moving body of a fluid discharge apparatus or a head, a method for attaching a moving body to a fluid discharge apparatus or a head, or an assembly method, manufacturing method, or the like of a fluid discharge apparatus or a head.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
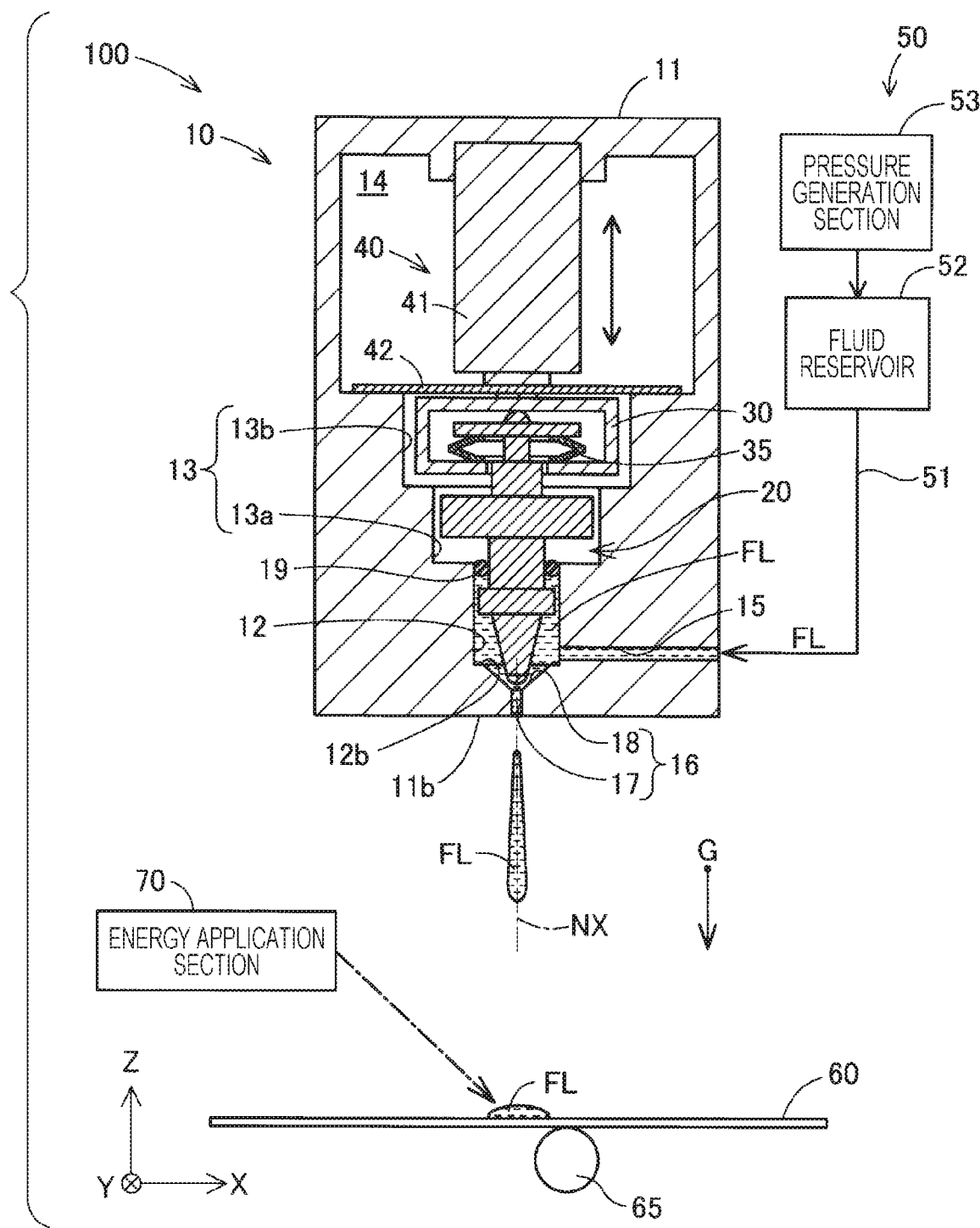
FIG. 1 is a schematic diagram illustrating an overall configuration of a fluid discharge apparatus.

FIG. 1 is a schematic diagram illustrating an overall configuration of a fluid discharge apparatus 100 of a first embodiment. In FIG. 1, the arrow G indicates the direction in which gravity acts (vertical direction) when the fluid discharge apparatus 100 is disposed in a normal usage state. FIG. 1 illustrates three arrows X, Y, and Z indicating mutually orthogonal directions. The arrows X and Y indicate directions running parallel to a horizontal plane. The arrow Z indicates a height direction, this being the opposite direction to the direction of gravity. In the following explanation, the directions indicated by the arrows X, Y, and Z are also respectively referred to as the "X direction", the "Y direction", and the "Z direction". Moreover, the opposite directions to the directions indicated by the arrows X, Y, and Z are also respectively referred to as the "−X direction", the "−Y direction", and the "−Z direction". The arrows X, Y, and Z are illustrated as appropriate in the respective drawings referred to in the present specification.

The fluid discharge apparatus 100 is provided to a three-dimensional formation apparatus. The fluid discharge apparatus 100 discharges a fluid FL to form a three-dimensional object by building up cured layers of the fluid FL. In the present specification, "discharging" refers to the use of some sort of force, including gravitational force, to expel a fluid to the exterior of a space in which the fluid is stored, and includes the concept of "ejection", in which fluid is expelled under pressure. Specific examples of the fluid FL discharged by the fluid discharge apparatus 100 as a material for forming a three-dimensional object, this being a formation target, will be described later. The fluid discharge apparatus 100 includes a discharge section 10 that discharges the fluid FL.

The discharge section 10 corresponds to a head of the three-dimensional formation apparatus, and discharges the fluid FL, this being a material with fluid characteristics, in fluid droplets. "Fluid droplets" refers to blob-shaped drops of the fluid, and refers to liquid droplets in cases in which the fluid is a liquid. The shape of the fluid droplets is not limited, and the fluid droplets may be spherical, may have a spherical shape extended in one direction, or may be needle-like, rod-like, or thread-like in shape. Moreover, there is no limitation to discharging a single fluid droplet with each discharge, and plural fluid droplets may be discharged.

The discharge section 10 includes a head body 11. The head body 11 is configured as a hollow container having a substantially circular cylinder shape. The head body 11 is, for example, configured by stainless steel. The head body 11 includes, for example, a storage chamber 12, an intermediate chamber 13, a drive chamber 14, a moving body 20, a coupling member 30, and a drive mechanism 40.

The storage chamber 12 is provided at a lower end of the head body 11. The storage chamber 12 stores the fluid FL that is to be discharged by the discharge section 10. In the present embodiment, the storage chamber 12 is configured by a substantially circular column shaped cavity. A supply path 15 through which fluid FL is conveyed under pressure from a supply section 50, described later, is connected to the storage chamber 12 from the side. The supply path 15 is configured as a tube that passes through an external wall of the head body 11. A bottom face 12b of the storage chamber 12 is provided with a discharge port 16 that functions as a nozzle to discharge the fluid FL.

The discharge port 16 is provided as a through hole placing the storage chamber 12 in communication with the exterior of the head body 11, and is opened in the vertical direction at a bottom face 11b of the head body 11. In the present embodiment, a central axis NX of the discharge port 16 runs in a direction along the Z direction. The discharge port 16 has a substantially circular opening cross-section along the Z direction.

The discharge port 16 preferably includes a vertical hole portion 17 and a diameter reduction portion 18. The vertical hole portion 17 is a location in communication with the exterior of the head body 11 and has a substantially uniform diameter. The diameter of the opening of the vertical hole portion 17 may, for example, be approximately 10 μm to 200 μm. The diameter reduction portion 18 is positioned above the vertical hole portion 17, and is a location with a diameter that decreases on progression downward. A vertical direction length of the discharge port 16, including the vertical hole portion 17 and the diameter reduction portion 18, may for example be approximately 10 μm to 30 μm. The diameter reduction portion 18 may be omitted.

The intermediate chamber 13 is positioned above the storage chamber 12. The intermediate chamber 13 includes a first intermediate chamber 13a positioned on a lower side, and a second intermediate chamber 13b positioned on an upper side. In the present embodiment, the first intermediate chamber 13a and the second intermediate chamber 13b are configured as substantially circular column shaped cavities. The internal diameter of the first intermediate chamber 13a is larger than the internal diameter of the storage chamber 12, and the internal diameter of the second intermediate chamber 13b is larger than the internal diameter of the first intermediate chamber 13a. The drive chamber 14 is positioned above the second intermediate chamber 13b.

The moving body 20 is housed spanning between the storage chamber 12 and the second intermediate chamber 13b of the intermediate chamber 13. The moving body 20 is inserted through a central through hole provided with an annular sealing member 19 that spatially partitions the storage chamber 12 from the intermediate chamber 13. The coupling member 30 is housed in the second intermediate chamber 13b, and couples the moving body 20 to the drive mechanism 40 such that the moving body 20 can be attached and detached.

The drive mechanism 40 is housed in the drive chamber 14, and generates drive force in order to move the moving body 20. In the discharge section 10, the movement of a piston moves the moving body 20 up and down to-and-fro along the Z direction while sliding against an inner peripheral face of the sealing member 19, thereby discharging the fluid FL in the storage chamber 12 from the discharge port 16. Detailed configuration of the moving body 20, the coupling member 30, and the drive mechanism 40, and detailed configuration of the mechanism by which the fluid FL is discharged by displacement of the moving body 20, will be described later.

In addition to the discharge section 10, the fluid discharge apparatus 100 also includes the supply section 50, a formation stage 60, a moving mechanism 65, and an energy application section 70. The supply section 50 feeds fluid FL under pressure to the storage chamber 12 of the discharge section 10 via the supply path 15. The supply section 50 includes a tube 51, a fluid reservoir 52, and a pressure generation section 53.

The tube 51 connects the supply path 15 of the head body 11 to the fluid reservoir 52. The fluid reservoir 52 is the source of fluid FL supply in the fluid discharge apparatus 100, and is configured by a tank that holds the fluid FL. In the fluid reservoir 52, a solvent is mixed with the stored fluid FL so as to maintain the viscosity of the fluid FL at a predetermined specific viscosity. The viscosity of the fluid FL may, for example, be approximately 50 mPa·s to 40,000 mPa·s.

The pressure generation section 53 is, for example, configured by a pressurizing pump. The pressure generation section 53 applies pressure to the fluid FL in the fluid reservoir 52 in order to feed the fluid FL under pressure to the head body 11 via the tube 51. For example, the pressure generation section 53 applies a pressure of approximately 0.4 MPa to 0.6 MPa to the fluid FL. Note that in FIG. 1, the pressure generation section 53 is provided upstream of the fluid reservoir 52. However, the pressure generation section 53 may be provided downstream of the fluid reservoir 52.

The formation stage 60 is disposed in the path of the discharge section 10 in the opening direction of the discharge port 16. The discharge section 10 discharges the fluid FL onto the formation stage 60. A three-dimensional object is formed by fluid droplets of the fluid FL discharged onto the formation stage 60. In the present embodiment, the formation stage 60 is configured by a flat plate shaped member, and is disposed in the horizontal direction. The formation stage 60 is, for example, disposed at a position at a separation of approximately 1.5 mm to 3 mm below the discharge port 16 in the vertical direction.

The moving mechanism 65 includes motors, rollers, shafts, and various actuators that displace the formation stage 60 with respect to the discharge section 10. The moving mechanism 65 displaces the formation stage 60 in the horizontal direction and the vertical direction relative to the discharge section 10. The position at which the fluid FL is discharged onto the formation stage 60 is adjusted in this manner. Note that the fluid discharge apparatus 100 may be configured such that the position of the formation stage 60 is fixed, and the discharge section 10 is displaced with respect to the formation stage 60 by a moving mechanism.

The energy application section 70 applies energy to the fluid FL discharged onto the formation stage 60, thereby curing the fluid FL. In the present embodiment, the energy application section 70 is configured by a laser device, and optical energy is applied to the fluid FL by irradiating with the laser. The energy application section 70 includes, at a minimum, a laser light source, a focusing lens to focus a laser emitted by the laser light source on the fluid FL discharged onto the formation stage 60, and a mirror galvanometer to cause the laser to scan (not illustrated in the drawings). The energy application section 70 scans across fluid droplets discharged onto the formation stage 60 with the laser, such that optical energy of the laser sinters together powdered material within the fluid FL. Alternatively, powdered material within the fluid FL may be melted and fused together. A layer of material configuring the three-dimensional object is thereby formed on the formation stage 60.

The energy application section 70 may cure the fluid FL using a method other than laser irradiation. The energy application section 70 may cure the fluid FL by ultraviolet irradiation, or may use a heater to apply heat to drive off at least some of the solvent in the fluid FL and cure the powdered material. Note that the three-dimensional object formed on the formation stage 60 may undergo a sintering process in a heating oven if required.

Based on the above configuration, the fluid discharge apparatus 100 of the present embodiment uses the fluid FL subject to discharge as the material for forming the three-dimensional object. Explanation follows regarding specific examples of the fluid FL used as the material for the three-dimensional object. In the present embodiment, the fluid FL is a fluid composition in paste form, and includes a powdered material and a solvent. The fluid FL may include a powdered material and a solvent. For example, the powdered material may be a powder of a single substance out of magnesium (Mg), iron (Fe), cobalt (Co), chromium (Cr), aluminum (Al), titanium (Ti), copper (Cu), or nickel (Ni), may be an alloy powder containing one or more out of the foregoing metals (maraging steel, stainless steel, cobalt-chromium-molybdenum, a titanium alloy, a nickel alloy, an aluminum alloy, a cobalt alloy, or a cobalt-chromium alloy), or may be a mixed power combining one or two or more powders selected from the single-substance powders and/or the alloy powders. For example, the solvent in the fluid FL may be: water; a (poly)alkylene glycol monoalkyl ether such as ethylene glycol monomethyl ether, ethylene glycol monoethyl ether, propylene glycol monomethyl ether, or propylene glycol monoethyl ether; an acetic acid ester such as ethyl acetate, n-propyl acetate, iso-propyl acetate, n-butyl acetate, or iso-butyl acetate; an aromatic hydrocarbon such as benzene, toluene, or xylene; a ketone such as methyl ethyl ketone, acetone, methyl isobutyl ketone, ethyl-n-butyl ketone, diisopropyl ketone, or acetyl acetone; an alcohol such as ethanol, propanol, or butanol; a tetraalkyl ammonium acetate; a sulfoxide-based solvent such as dimethyl sulfoxide or diethyl sulfoxide; a pyridine-based solvent such as pyridine, γ-picoline, or 2,6-lutidine; an ionic liquid such as a tetraalkyl ammonium acetate (for example, tetrabutyl ammonium acetate or the like); or a combination that includes one or two or more solvents selected from these.

The fluid FL may be configured in slurry form by mixing a binder with the powdered material and solvent described above, or may be configured as a mixed material in paste form. For example, the binder may be: an acrylic resin, an epoxy resin, a silicone resin, a cellulose-based resin, or another synthetic resin; or polylactic acid (PLA), polyamide (PA), polyphenylene sulfide (PPS), or another thermoplastic resin. The fluid FL is not limited to fluids that include the above powered materials, and may, for example, be a melted resin such as a general purpose engineering plastic such as a polyamide, a polyacetal, a polycarbonate, a modified polyphenylene ether, polybutylene terephthalate, or polyethylene terephthalate. Other examples that may be employed as the fluid FL include resins such as engineering plastics such as a polysulfone, a polyether sulfone, a polyphenylene sulfide, a polyarylate, a polyimide, a polyamide-imide, a polyether imide, or a polyether ether ketone. The fluid FL may include a metal other than the metals above, a ceramic, a resin, or the like. The fluid FL may include a sintering agent.

Figure 2:
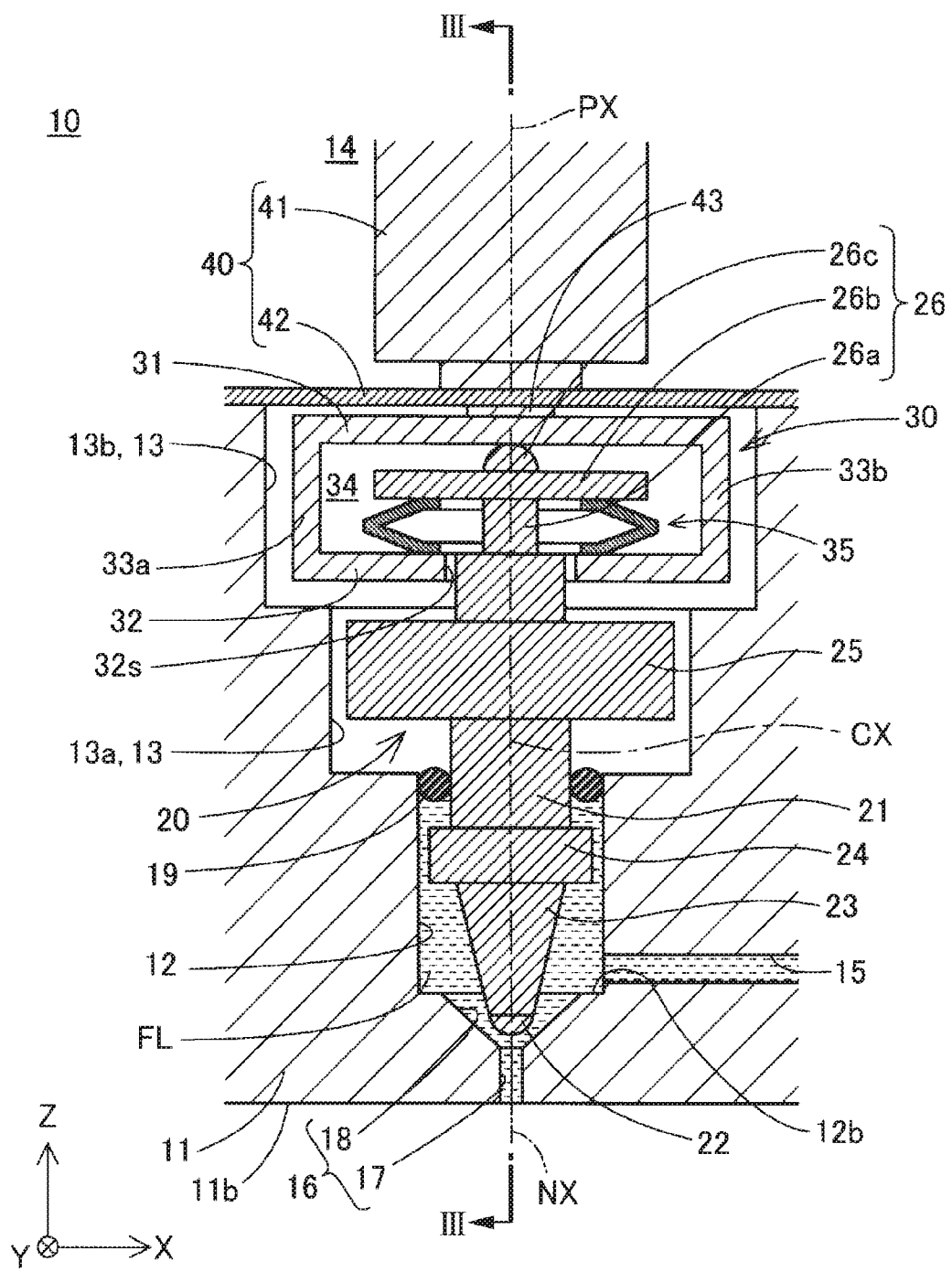
FIG. 2 is a schematic diagram illustrating part of an internal configuration of a discharge section in isolation.

FIG. 2 is a schematic diagram illustrating part of the internal configuration of the discharge section 10 in isolation. As described above, the head body 11 of the discharge section 10 includes the storage chamber 12, the intermediate chamber 13, and the drive chamber 14, and the moving body 20 is housed spanning between the storage chamber 12 and the intermediate chamber 13.

The moving body 20 is configured from metal. The moving body 20 includes a column shaped main body 21. In the present embodiment, the main body 21 has a substantially circular column shape. The diameter of the main body 21 may, for example, be approximately 0.3 mm to 5 mm. The main body 21 is disposed spanning between the storage chamber 12 and the intermediate chamber 13. The moving body 20 is preferably disposed such that a central axis CX of the main body 21 is substantially aligned with the central axis NX of the discharge port 16.

As described above, the annular sealing member 19 is disposed at a boundary between the storage chamber 12 and the intermediate chamber 13. The sealing member 19 is configured by a resin O-ring. The sealing member 19 is attached to the main body 21 so as to be airtight. The sealing member 19 suppresses the fluid FL in the storage chamber 12 from entering the intermediate chamber 13 and the drive chamber 14. The coupling member 30 and the drive mechanism 40 are thus protected from the fluid FL.

The moving body 20 includes a leading end portion 22, a tapered portion 23, and a flange portion 24 at locations disposed inside the storage chamber 12. The moving body 20 also includes a projection portion 25 and a trailing end portion 26 at locations disposed inside the intermediate chamber 13.

The leading end portion 22 is positioned on the central axis CX, and faces toward the discharge port 16. The leading end portion 22 preferably has a substantially semispherical shape. The horizontal direction diameter of the leading end portion 22 is preferably larger than the diameter of the opening of the vertical hole portion 17, and smaller than the diameter of the opening at an upper end of the diameter reduction portion 18 of the discharge port 16.

The tapered portion 23 is positioned above the leading end portion 22, and is a location that gradually decreases in diameter on progression downward toward the leading end portion 22. Providing the tapered portion 23 reduces resistance as the moving body 20 moves through the storage chamber 12 in which the fluid FL is stored. The tapered portion 23 may be omitted. The flange portion 24 is a location that projects out from the main body 21 in a direction intersecting the central axis CX. The flange portion 24 has a function of pushing the fluid FL in the storage chamber 12 toward the discharge port 16 when the moving body 20 moves in a direction toward the discharge port 16. The flange portion 24 may be omitted.

The projection portion 25 is disposed in the first intermediate chamber 13a. The projection portion 25 is a location projecting out from the main body 21 in a direction intersecting the central axis CX. In the present embodiment, the projection portion 25 has an annular shape centered on the main body 21. The diameter of the projection portion 25 is slightly smaller than the internal diameter of the first intermediate chamber 13a. A gap between a peripheral outside face of the projection portion 25 and a side wall face of the storage chamber 12 may be approximately 10 μm to 100 μm. The projection portion 25 functions as a guide that restricts the path of the moving body 20 from deviating as it moves to-and-fro. Note that in order to reduce the weight of the moving body 20 and reduce resistance when the moving body 20 moves, a portion where material is removed, such as a through hole, may be formed through the projection portion 25 along the Z direction. The projection portion 25 may be omitted from the moving body 20.

The trailing end portion 26 is positioned in the second intermediate chamber 13b, and is housed inside the coupling member 30, as will be described later. The trailing end portion 26 includes a neck 26a and an overhang portion 26b. The neck 26a is a location having a smaller diameter than the main body 21. A step is formed between the neck 26a and the main body 21 projecting out upward from the projection portion 25. The neck 26a may be omitted.

The overhang portion 26b juts out with respect to the main body 21 in a direction intersecting the central axis CX. In the present embodiment the overhang portion 26b is configured as a substantially plate shaped portion jutting out orthogonally to the central axis CX in a radial direction of the moving body 20. The shape of the outline of the outer periphery of the overhang portion 26b as viewed along a direction following the central axis CX direction is not particularly limited. The shape of the outline of the outer periphery of the overhang portion 26b may be a substantially circular shape, may be a substantially elliptical shape, may be a substantially triangular shape, may be a substantially quadrilateral shape, or may be another substantially polygonal shape. The overhang portion 26b may include a portion where material is removed, such as a through hole or a recess. As described later, the overhang portion 26b is subject to elastic force in an upward direction from a biasing section 35 of the coupling member 30.

An upper face of the overhang portion 26b that faces an upper face wall 31 of the coupling member 30 is provided with an abutting portion 26c. The abutting portion 26c is a portion where the overhang portion 26b locally abuts the coupling member 30. In the present embodiment, the abutting portion 26c is formed as a protrusion on the central axis CX so as to project from the overhang portion 26b toward the upper face wall 31 of the coupling member 30. The abutting portion 26c is preferably configured capable of making point contact with the upper face wall 31 of the coupling member 30. The abutting portion 26c preferably has a curved face protruding toward the coupling member 30. The location where the abutting portion 26c projects out furthest in a direction along the central axis CX direction is preferably positioned on the central axis CX. The abutting portion 26c preferably has a substantially hemispherical shape positioned so as to be centered on the central axis CX. The abutting portion 26c may be provided by joining a spherical member to an upper face of the overhang portion 26b.

The coupling member 30 is a member that couples the moving body 20 to the drive mechanism 40 such that the moving body 20 can be attached and detached, and is positioned in the second intermediate chamber 13b. The coupling member 30 is configured from a metal such as stainless steel. As described above, in the present embodiment, the coupling member 30 internally houses the trailing end portion 26 of the moving body 20 and retains the moving body 20. The coupling member 30 includes the upper face wall 31, a bottom face wall 32, and a pair of side walls 33a, 33b.

The upper face wall 31 is a wall disposed in the horizontal direction at the side of the drive chamber 14 positioned at an upper side thereof. As described later, the upper face wall 31 is joined to a support member 42 of the drive mechanism 40. The bottom face wall 32 is a wall disposed in the horizontal direction at the side of the first intermediate chamber 13a positioned at a lower side thereof. A slit 32s is formed running along the Y direction at the horizontal direction center of the bottom face wall 32. An end portion of the slit 32s is open toward the −Y direction. The moving body 20 is inserted through the slit 32s along the Y direction.

The pair of side walls 33a, 33b are walls coupling the upper face wall 31 and the bottom face wall 32 together. The pair of side walls 33a, 33b respectively reach down from X direction end portions of the upper face wall 31, and are coupled to X direction end portions of the bottom face wall 32.

An internal space 34 enclosed by the respective walls 31, 32, 33a, and 33b described above is formed inside the coupling member 30. In the present embodiment, the coupling member 30 is open toward the −Y direction. The trailing end portion 26 of the moving body 20 is inserted into the internal space 34 of the coupling member 30 along the +Y direction so as to be housed inside the internal space 34.

The biasing section 35 is provided inside the internal space 34 of the coupling member 30. The biasing section 35 applies an elastic force to the moving body 20 to press the moving body 20 against the coupling member 30, in a direction toward the drive mechanism 40. The biasing section 35 supports the moving body 20 in a state in which the biasing section 35 is capable of elastically deforming in a contracting direction, such that the moving body 20 is capable of elastic displacement in the direction toward the discharge port 16 with respect to the coupling member 30.

In the present embodiment, the biasing section 35 is installed on the bottom face wall 32 of the coupling member 30, and is disposed below the overhang portion 26b of the moving body 20. The biasing section 35 is provided so as to surround the periphery of the central axis CX. The biasing section 35 applies an elastic force to the moving body 20 in a direction along the central axis CX. The biasing section 35 applies the elastic force in a direction pressing the overhang portion 26b toward the upper face wall 31, namely, in the direction toward the drive mechanism 40.

The moving body 20 is supported by the biasing section 35 in a state in which the abutting portion 26c is in contact with the upper face wall 31 of the coupling member 30. The biasing section 35 preferably applies the elastic force substantially uniformly around the periphery of the abutting portion 26c, such that locations other than the abutting portion 26c of the moving body 20 do not abut the coupling member 30. In the present embodiment, the biasing section 35 is configured by an elastic member. For example, a disc spring or a coil spring is employed as the elastic member. The central axis of such a disc spring or coil spring is preferably disposed in alignment with the central axis CX of the moving body 20.

The moving body 20 is supported by the biasing section 35 in a state in which the biasing section 35 is capable of elastically displacing the moving body 20 with respect to the coupling member 30 in a direction along the central axis CX. This facilitates attachment and detachment of the moving body 20 to and from the coupling member 30 (described in detail later).

In the coupling member 30, when the moving body 20 is subject to external force from a direction intersecting the central axis CX, the biasing section 35 elastically deforms, permitting the central axis CX of the moving body 20 to tilt with respect to the coupling member 30. In the coupling member 30 of the present embodiment, the central axis CX is permitted to rotate and move elastically about the point of contact between the abutting portion 26c and the coupling member 30. Namely, the coupling member 30 retains the moving body 20 in a state in which the leading end portion 22 of the moving body 20 is capable of elastic displacement in a direction intersecting the central axis CX. Flexibly retaining the moving body 20 in this manner absorbs positioning error of the leading end portion 22 of the moving body 20 with respect to the discharge port 16 during a process to discharge the fluid FL (described in detail later).

As described above, the drive mechanism 40 is housed in the drive chamber 14. The drive mechanism 40 is positioned on the opposite side of the moving body 20 to the discharge port 16. The drive mechanism 40 is positioned in a direction along the central axis CX. The drive mechanism 40 generates drive force that displaces the moving body 20 in a direction along the central axis CX direction. In the present embodiment, the drive mechanism 40 includes a piezoelectric element 41 and the support member 42.

The piezoelectric element 41 is also referred to as a "piezo-element". The piezoelectric element 41 extends and contracts along a central axis PX in response to an electrical drive force. The piezoelectric element 41 is configured including plural layers of stacked piezoelectric material, and the stacking direction length of the piezoelectric element 41 changes according to the magnitude of a voltage applied to the respective piezoelectric materials. The piezoelectric element 41 is preferably disposed such that the central axis PX of the piezoelectric element 41 is in alignment with the central axis CX of the moving body 20. An upper end portion of the piezoelectric element 41 is fixed to an upper wall face of the drive chamber 14, and a lower end portion of the piezoelectric element 41 is in contact with the support member 42.

The support member 42 is what is referred to as a diaphragm, and is configured by a flexibly deformable metal membranous member. The support member 42 has a thickness of 1 mm or less, and preferably has a thickness of 0.5 mm or less. The support member 42 is drawn over the bottom of the drive chamber 14. The support member 42 is disposed between the piezoelectric element 41 and the coupling member 30.

Peripheral edge portion of the support member 42 is fixed to wall faces of the drive chamber 14. A central portion of the support member 42 is in contact with a lower end portion of the piezoelectric element 41. The support member 42 is joined to the upper face wall 31 of the coupling member 30 through a joint 43. The joint 43 is positioned on the central axis NX of the discharge port 16. The joint 43 is, for example, formed by laser welding.

The support member 42 applies pressure to the piezoelectric element 41 from when in a contracted state. The pressure applied to the piezoelectric element 41 by the support member 42 may, for example, be approximately 10 N to 300 N. When the piezoelectric element 41 extends, the support member 42 is pressed by the piezoelectric element 41 so as to flex. The support member 42 is capable of flexural deformation by a deformation amount corresponding to the distance of the to-and-fro movement of the moving body 20. The piezoelectric element 41 deforms so as to extend and contract in a state in which the piezoelectric element 41 is applied with pressure along the extension-contraction direction by the support of the support member 42. The piezoelectric element 41 is thereby suppressed from overextending, thereby suppressing damage to, and deterioration of, the piezoelectric element 41 due to ringing.

As described later, the operation of the drive mechanism 40 includes operation to press and move the moving body 20 toward the discharge port 16, and operation to pull and move the moving body 20 away from the discharge port 16. When the piezoelectric element 41 deforms so as to extend in response to electric drive force, the support member 42 flexes downward, and the moving body 20 moves downward together with the coupling member 30. Accordingly, the leading end portion 22 of the moving body 20 fits into the diameter reduction portion 18 of the discharge port 16 in a state of line contact, thus closing off the discharge port 16. When the piezoelectric element 41 deforms so as to contract in response to electric drive force, the flexure of the support member 42 is released, and the moving body 20 moves upward together with the coupling member 30. Accordingly, the leading end portion 22 of the moving body 20 moves away from the discharge port 16, thus opening up the discharge port 16. In the present embodiment, the moving body 20 is moved over a range of approximately 10 μm to 500 μm by the drive mechanism 40.

In this manner, in the fluid discharge apparatus 100 of the present embodiment, the moving body 20 is coupled to a leading end portion of the piezoelectric element 41 through the coupling member 30, and is pulled up in a direction away from the discharge port 16 when the piezoelectric element 41 deforms so as to contract in response to electric drive force. In the fluid discharge apparatus 100, the moving body 20 follows the contractive deformation of the piezoelectric element 41 even though no biasing member is provided to bias the moving body 20 in the direction away from the discharge port 16. Biasing force of such a biasing member is thus suppressed from cancelling out thrust when the moving body 20 is moved toward the discharge port 16. Control of the movement of the moving body 20 is thus made more efficient. Moreover, a reduction in size of the drive mechanism 40 is enabled since there is no need to increase the size of the piezoelectric element 41 in consideration of thrust being cancelled out by such a biasing member.

Explanation follows regarding the mechanism by which the fluid discharge apparatus 100 discharges fluid. First, in a state in which the leading end portion 22 of the moving body 20 has closed off the discharge port 16, the fluid FL in the storage chamber 12 is conveyed under pressure through the supply section 50, and the pressure inside the storage chamber 12 is raised to a predetermined pressure. Then, as described above, the drive mechanism 40 pulls up the moving body 20 together with the coupling member 30, moving the moving body 20 in the direction away from the discharge port 16. In the present embodiment, the "direction of the moving body 20 away from the discharge port 16" is the Z direction. When this is performed, the fluid FL flows between the leading end portion 22 of the moving body 20 and the discharge port 16, using the internal pressure of the storage chamber 12 as drive force.

Next, at a predetermined timing after the discharge port 16 has been opened, the drive mechanism 40 pushes the moving body 20 down together with the coupling member 30, moving the moving body 20 in the direction toward the discharge port 16. In the present embodiment, the "direction of the moving body 20 toward the discharge port 16" is the −Z direction. When this is performed, the fluid FL is pushed toward the discharge port 16 by the leading end portion 22 of the moving body 20, and starts to flow out to the exterior of the head body 11 through the discharge port 16. The leading end portion 22 of the moving body 20 then closes off the discharge port 16 such that the fluid FL that has flowed out through the discharge port 16 is separated from the fluid FL inside the discharge port 16, and a droplet of the fluid FL flies toward a predetermined target position on the formation stage 60.

Figure 3:
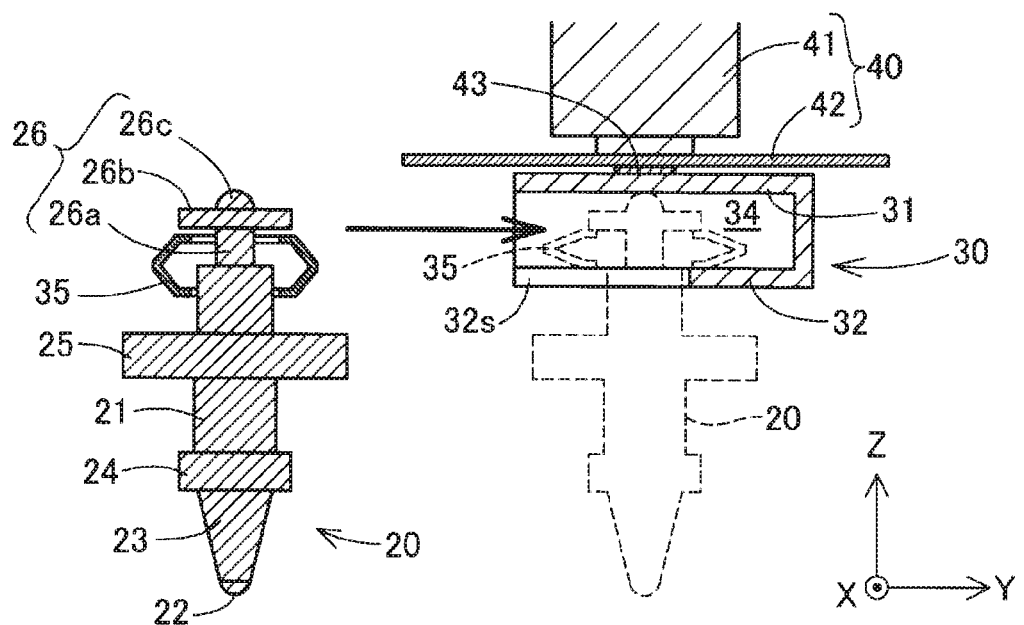
FIG. 3 is a schematic diagram to explain attachment and detachment of a moving body to and from a coupling member.

FIG. 3 is a schematic diagram to explain attachment and detachment of the moving body 20 to and from the coupling member 30. FIG. 3 illustrates a schematic cross-section of the coupling member 30 and the moving body 20, as sectioned along line III-III in FIG. 2. The trailing end portion 26 of the moving body 20 is inserted through the opening in the coupling member 30 in the +Y direction, in a state in which the biasing section 35 is attached below the overhang portion 26b. When this is performed, the biasing section 35 is pressed into the internal space 34 of the coupling member 30 in an elastically contracted state. The trailing end portion 26 of the moving body 20 is pressed toward the upper face wall 31 by elastic force of the biasing section 35, thereby fixing the trailing end portion 26 to the coupling member 30. This thereby enables simple attachment of the moving body 20 to the coupling member 30.

When removing the moving body 20 from the coupling member 30, the biasing section 35 is made to elastically contract, thereby separating the trailing end portion 26 of the moving body 20 from the upper face wall 31 of the coupling member 30. The trailing end portion 26 of the moving body 20 can thus be easily pulled away from the internal space 34 of the coupling member 30 along the Y direction, enabling simple removal of the moving body 20 from the coupling member 30. Since operations to attach and detach the moving body 20 to and from the coupling member 30 can be performed simply, operations to exchange moving bodies 20 having different sizes, operations to dismantle the discharge section 10, and maintenance operations are simplified.

Referring now to FIG. 2, as described above, in the present embodiment the coupling member 30 moves to-and-fro together with the moving body 20. When this occurs, there is almost no action of the elastic force of the biasing section 35 against the thrust of the moving body 20 generated by the drive mechanism 40.

Moreover, in the present embodiment, the moving body 20 is retained in a state in which the leading end portion 22 of the moving body 20 is capable of elastic displacement in a direction intersecting the central axis CX. Accordingly, in a process to attach the moving body 20 to the coupling member 30, even if positional offset arises between the moving body 20 and the discharge port 16, when the moving body 20 is moved toward the discharge port 16, displacement of the leading end portion 22 of the moving body 20 toward the discharge port 16 is permitted. Accordingly, positioning error of the moving body 20 is absorbed by the elastic displacement of the moving body 20, and issues such as poor discharge of the fluid FL as a result of positional offset of the moving body 20 are suppressed from arising.

In particular, in the present embodiment, the abutting portion 26c of the moving body 20 makes point contact with the upper face wall 31 of the coupling member 30, and the central axis CX of the moving body 20 is configured so as to readily undergo elastic displacement about the apex of the abutting portion 26c. Accordingly, positioning error of the moving body 20 is more readily absorbed. Moreover, since the discharge port 16 includes the diameter reduction portion 18, the leading end portion of the moving body 20 is guided to an appropriate mounting position at the discharge port 16, thus suppressing positional offset between the discharge port 16 and the leading end portion 22. In addition, positional offset between the discharge port 16 and the leading end portion 22 is also suppressed due to the projection portion 25 of the moving body 20 being guided by the wall faces of the first intermediate chamber 13a.

As described above, the fluid discharge apparatus 100 of the present embodiment enables simple attachment and detachment of the moving body 20 to and from the drive mechanism 40 through the coupling member 30 that includes the biasing section 35. Accordingly, operations to exchange the moving body 20 and maintenance operations on the discharge section 10 of the fluid discharge apparatus 100 are facilitated. Moreover, since a biasing member to apply a biasing force to move the moving body 20 in the direction away from the discharge port 16 can be omitted, an efficient configuration is achieved in which a reduction in the thrust on the moving body 20 from the drive mechanism 40 caused by such a biasing member is suppressed. Moreover, even if positioning error arises between the discharge port 16 and the moving body 20, such positioning error is absorbed by elastic displacement of the leading end portion 22 of the moving body 20 in a direction intersecting the central axis CX. Issues arising due to positioning error of the moving body 20 are thereby suppressed from arising. Moreover, the precision demanded when positioning the moving body 20 with respect to the discharge section 10 is relaxed, enabling the time taken to perform an operation to attach the moving body 20 to be reduced. Moreover, the fluid discharge apparatus 100 of the present embodiment enables the various other operation and advantageous effects described in the present embodiment to be achieved.

B. Second Embodiment

Figure 4:
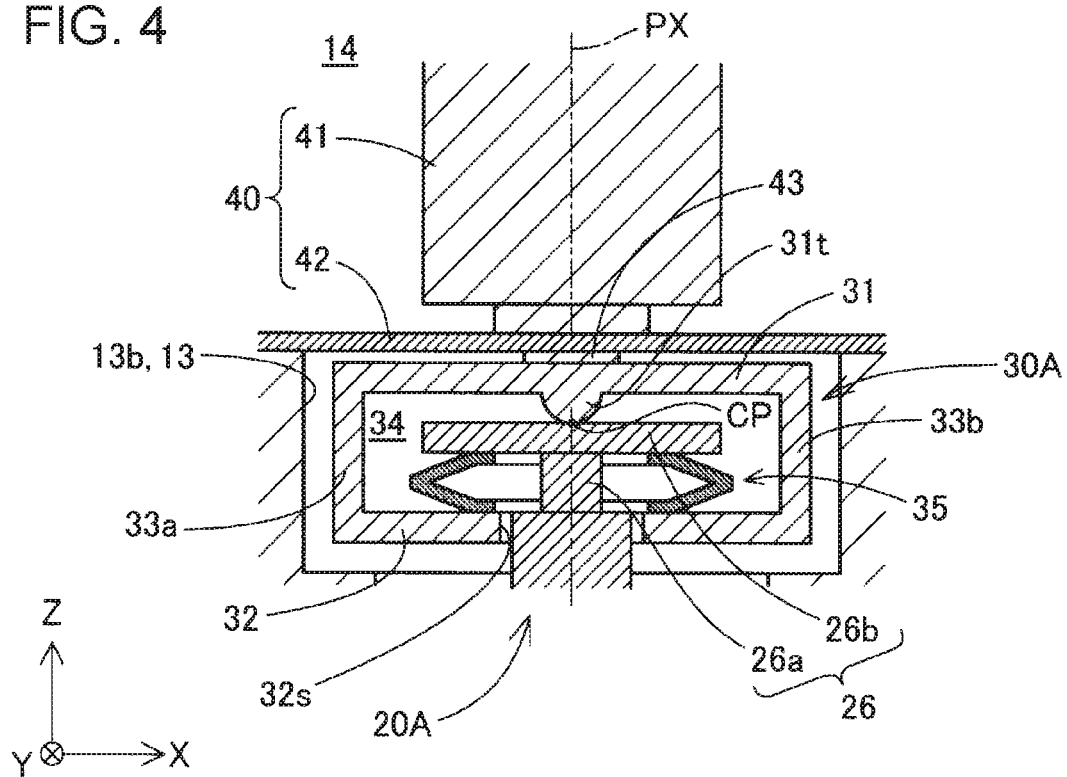
FIG. 4 is a schematic diagram illustrating configuration of a moving body and a coupling member of a second embodiment.

FIG. 4 is a schematic diagram illustrating configuration of a moving body 20A and a coupling member 30A provided to a fluid discharge apparatus of a second embodiment. The configuration of the fluid discharge apparatus of the second embodiment is substantially the same as the configuration of the fluid discharge apparatus 100 of the first embodiment, with the exception of the following differences in the configuration of the moving body 20A and the coupling member 30A. The configuration of the moving body 20A of the second embodiment is substantially the same as the configuration of the moving body 20 of the first embodiment, with the exception of the point that the abutting portion 26c of the trailing end portion 26 is omitted. Moreover, the configuration of the coupling member 30A of the second embodiment is substantially the same as the configuration of the coupling member 30 of the first embodiment, with the exception of the point that a projection 31t is provided.

The projection 31t projects toward the overhang portion 26b at a lower face of the upper face wall 31 that faces the overhang portion 26b of the moving body 20A. The coupling member 30A locally contacts the overhang portion 26b of the moving body 20A at the projection 31t. The projection 31t is preferably provided positioned on the central axis PX of the piezoelectric element 41. The moving body 20A is preferably attached to the coupling member 30A such that the position of the projection 31t is on the central axis CX, namely, such that a contact point CP of the projection 31t is positioned on the central axis CX at the overhang portion 26b.

The projection 31t is preferably configured capable of making point contact with the upper face of the overhang portion 26b of the moving body 20A. The projection 31t preferably has a curved face protruding downward. Moreover, the location where the projection 31t projects out furthest in the −Z direction is preferably positioned on the central axis PX of the piezoelectric element 41. The projection 31t preferably has a substantially hemispherical shape. The projection 31t may be provided by joining a spherical member to the upper face wall 31.

In the fluid discharge apparatus of the second embodiment, the projection 31t of the coupling member 30A functions as a fulcrum about which the central axis CX of the moving body 20A undergoes elastic displacement. Accordingly, similarly to as described in the first embodiment, issues resulting from positional offset between the discharge port 16 and the leading end portion 22 of the moving body 20A are suppressed from arising. Moreover, in the fluid discharge apparatus of the second embodiment, the central axis CX of the moving body 20A can be positioned using the projection 31t of the coupling member 30A as a guide. In addition, the fluid discharge apparatus of the second embodiment also enables various operation and advantageous effects similar to those described in the first embodiment to be achieved.

C. Third Embodiment

Figure 5:
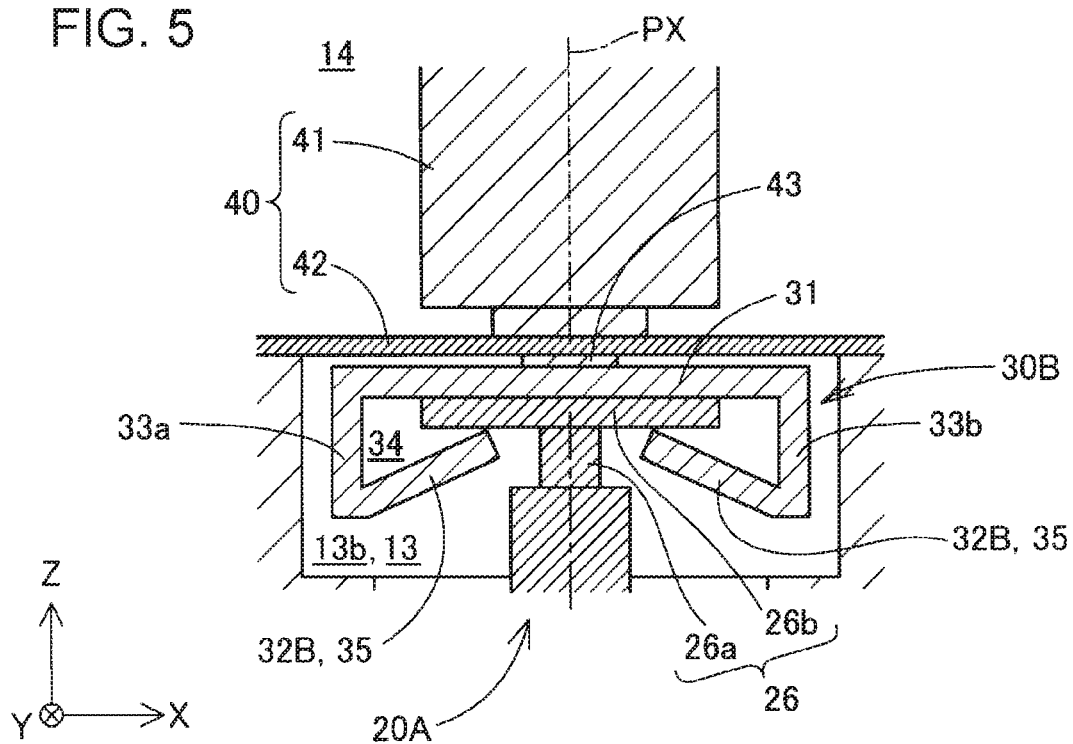
FIG. 5 is a schematic diagram illustrating configuration of a coupling member of a third embodiment.

FIG. 5 is a schematic diagram illustrating configuration of a coupling member 30B provided to a fluid discharge apparatus of a third embodiment. The configuration of the fluid discharge apparatus of the third embodiment is substantially the same as the configuration of the fluid discharge apparatus of the second embodiment, with the exception of the following differences in the configuration of the coupling member 30B. The configuration of the coupling member 30B of the third embodiment is substantially the same as the configuration of the coupling member 30 of the first embodiment, with the exception of the point that the biasing section 35 is configured by a bottom face wall 32B.

In the coupling member 30B of the third embodiment, the bottom face wall 32B is bent upward such that an overhang portion 26b of a moving body 20A is interposed between the bottom face wall 32B and the upper face wall 31. The bottom face wall 32B is configured by a flat spring, and functions as the biasing section 35 so as to retain the moving body 20A in a state capable of elastic displacement while applying an elastic force so as to press the overhang portion 26b of the moving body 20A toward the upper face wall 31.

Attachment and detachment of the moving body 20A to and from the drive mechanism 40 is facilitated by the coupling member 30B of the third embodiment. In the coupling member 30B of the third embodiment, although the entire upper face of the overhang portion 26b of the moving body 20A contacts the upper face wall 31 of the coupling member 30B, the leading end portion 22 is capable of elastic displacement in a direction intersecting the central axis CX due to being supported by the biasing section 35.

Accordingly, positioning error between the discharge port 16 and the moving body 20A can be absorbed as described in the first embodiment. In addition, the fluid discharge apparatus of the third embodiment also enables various operation and advantageous effects similar to those of the embodiments described above to be achieved.

D. Modified Examples

The various configurations in the embodiments described above may, for example, be modified in the following ways. Each of the configurations of the modified examples described below are considered to be examples of embodiments.

D1: Modified Example 1

In the embodiments described above, the moving body 20, 20A moves in a direction along the Z direction, this being a direction along the central axis NX of the discharge port 16. However, the movement direction of the moving body 20, 20A is not limited to a direction along the Z direction. The movement direction of the moving body 20, 20A may be a direction intersecting the Z direction. Similarly, the movement direction of the moving body 20, 20A does not have to be a direction along the central axis NX of the discharge port 16, and may be a direction intersecting the central axis NX of the discharge port 16. The discharge direction of the fluid FL by the fluid discharge apparatus 100 does not have to be a direction along the direction of gravity, and may be a direction intersecting the direction of gravity.

D2: Modified Example 2

In the embodiments described above, the moving body 20, 20A moves along a direction along its own central axis CX. However, the moving body 20, 20A does not have to move along a direction along its own central axis CX, and may be configured so as to move along a direction intersecting its own central axis CX. In the embodiments described above, in the process of discharging the fluid FL, the moving body 20, 20A closes off the discharge port 16 by the leading end portion 22 fitting into the discharge port 16. However, configuration may be made in which, in the process of discharging the fluid FL, the leading end portion 22 of the moving body 20, 20A does not move as far as a position that blocks off the discharge port 16.

D3: Modified Example 3

In the embodiments described above, the coupling member 30, 30A, 30B retains the moving body 20, 20A in a state in which the leading end portion 22 is rendered capable of undergoing elastic displacement in a direction intersecting the central axis CX by the elastic deformation of the biasing section 35. However, the coupling member 30, 30A, 30B does not have to retain the moving body 20, 20A in a state in which the leading end portion 22 is capable of elastic displacement in a direction intersecting the central axis CX. It is sufficient that, as a minimum, the coupling member 30, 30A, 30B retain the moving body 20, 20A in a state in which the moving body 20, 20A is capable of elastic displacement in a direction away from the drive mechanism 40.

D4: Modified Example 4

In the embodiments described above, the head body 11 is provided with the intermediate chamber 13. However, the intermediate chamber 13 may be omitted. The entire moving body 20, 20A and the coupling member 30 may be housed in the storage chamber 12. Moreover, in the embodiments described above, the intermediate chamber 13 is split into the first intermediate chamber 13a and the second intermediate chamber 13b that have different internal diameters to each other. However, the intermediate chamber does not have to be split into the first intermediate chamber 13a and the second intermediate chamber 13b. The intermediate chamber 13 may also be split into plural other spaces.

D5: Modified Example 5

In the embodiments described above, the biasing section 35 applies elastic force to the overhang portion 26b of the moving body 20, 20A so as to press the overhang portion 26b toward the upper face wall 31 of the coupling member 30. However, the biasing section 35 may apply elastic force to a location other than the overhang portion 26b. In such cases, the overhang portion 26b of the moving body 20, 20A may be omitted. For example, the biasing section 35 may engage with a recess provided in a side face of the main body 21 of the moving body 20, 20A so as to apply elastic force in a direction to move the moving body 20, 20A away from the discharge port 16.

D6: Modified Example 6

In the embodiments described above, the coupling member 30, 30A, 30B is configured including the upper face wall 31, the bottom face wall 32, 32B, and the pair of side walls 33a, 33b. The configuration of the coupling member 30, 30A, 30B is not limited to the shapes described in the above embodiments. For example, either one of the pair of side walls 33a, 33b may be omitted, or a wall other than the pair of side walls 33a, 33b may be additionally provided between the upper face wall 31 and the bottom face wall 32. Moreover, a columnar portion coupling the upper face wall 31 to the bottom face wall 32, 32B may be provided instead of the pair of side walls 33a, 33b.

D7: Modified Example 7

In the embodiments described above, explanation has been given regarding examples in which the biasing section 35 is configured by a spring such as a disc spring, a coil spring, or a flat spring. However, the biasing section 35 does not have to be configured by a spring. For example, the biasing section 35 may be configured by an elastic member formed from a resin having elastic properties, such as rubber.

D8: Modified Example 8

In the first embodiment described above, the abutting portion 26c is configured by a locally projecting protrusion at the center of the overhang portion 26b. However, the abutting portion 26c does not have to be configured as a locally projecting protrusion. For example, the abutting portion 26c may be configured by configuring the entire face of the overhang portion 26b on the drive mechanism 40 side as a curved face raised toward the drive mechanism 40 side.

D9: Modified Example 9

In the embodiments described above, the drive mechanism 40 includes the support member 42 that supports the piezoelectric element 41. However, the support member 42 of the drive mechanism 40 may be omitted. The coupling member 30 may be joined directly to the piezoelectric element 41.

D10: Modified Example 10

In the embodiments described above, the piezoelectric element 41 deforms so as to extend and contract such that the drive mechanism 40 generates thrust to move the moving body 20, 20A. However, the drive mechanism 40 may generate thrust to move the moving body 20, 20A using a method other than by the piezoelectric element 41 deforming so as to extend and contract. For example, the drive mechanism 40 may generate thrust to move the moving body 20, 20A using a solenoid.

D11: Modified Example 11

In the fluid discharge apparatus of the first embodiment described above, the upper face wall 31 of the coupling member 30 may be provided with the projection 31t described in the second embodiment. In the fluid discharge apparatus of the third embodiment above, the moving body 20 described in the first embodiment may be applied instead of the moving body 20A. Moreover, the upper face wall 31 of the coupling member 30B may be provided with the projection 31t described in the second embodiment.

D12: Modified Example 12

The fluid discharge apparatus of the embodiments described above is provided to a three-dimensional formation apparatus that discharges the fluid FL to form a three-dimensional object. However, the fluid discharge apparatus may, for example, be configured as an ink jet printer that discharges ink to form an image. In such cases, as a target object, the ink serving as the fluid FL is discharged onto a printing medium or recording medium instead of onto the formation stage 60. Alternatively, the fluid discharge apparatus may be configured as an adhesive-coating apparatus that discharges and coats with a liquid adhesive. Moreover, as the fluid FL, the fluid discharge apparatus of the embodiments above discharges a liquid material that is employed in the creation of solid objects. However, the fluid discharge apparatus of the embodiments above may discharge a fluid such as a gas, or a powder with fluid properties, as the fluid FL.

The invention is not limited to the embodiments, examples, and modified examples described above, and may be implemented by various configurations within a range not departing from the spirit of the invention. For example, the technical features contained in the embodiments, examples, and modified examples that correspond to the technical features of the various configurations described in the "Summary" section may be swapped or combined as appropriate in order to address some or all of the issues mentioned, or in order to achieve some or all of the advantageous effects mentioned. Moreover, not only the technical features described as not being essential in the present specification, but any technical feature that is not stated as being an essential in the present specification, may be omitted as appropriate.

The entire disclosure of Japanese Patent Application No. 2016-254734, filed Dec. 28, 2016 is expressly incorporated by reference herein.

What is claimed is:

1. A fluid discharge apparatus comprising:
   a storage chamber that stores a fluid and that includes a discharge port to discharge the fluid;
   a moving body that includes a leading end facing the discharge port inside the storage chamber, the moving body reciprocally moving in directions away from the discharge port and toward the discharge port so as to cause the fluid to flow out through the discharge port;
   a drive mechanism that is positioned on an opposite side of the moving body to the discharge port, the drive mechanism performing a first operation to physically pull the moving body so as to move the leading end away from the discharge port and a second operation to physically push the moving body so as to move the leading end toward the discharge port; and
   a coupling member that physically couples the moving body to the drive mechanism such that the moving body is attachable and detachable to the coupling member, the coupling member including a biasing member to apply an elastic force in a direction to move the moving body toward the drive mechanism, and wherein while the moving body is pressed against the coupling member, the coupling member supports the moving body in a state in which the moving body is configured to be elastically displaced in a direction toward the discharge port, wherein the drive mechanism includes a piezoelectric element that deforms so as to extend and contract along a central axis of the moving body in response to an electric drive force, the piezoelectric element pulls and moves the moving body by contracting under the electric drive force, and pushes and moves the moving body by extending under the electric drive force, and the drive mechanism includes a membranous support member that is disposed in a state of applying pressure to the piezoelectric element between the piezoelectric element and the coupling member, and that flexes together with extension and contraction of the piezoelectric element.

2. The fluid discharge apparatus according to claim 1, wherein the leading end of the moving body is on the central axis of the moving body, and the moving body further includes a trailing end positioned on the central axis on an opposite side to the leading end, the biasing member applies an elastic force to the trailing end, and the coupling member retains the moving body in a state in which the leading end undergoes elastic displacement in a direction intersecting the central axis by elastic deformation of the biasing member.

3. The fluid discharge apparatus according to claim 2, wherein the leading end of the moving body closes the discharge port when the moving body reaches the discharge port.

4. The fluid discharge apparatus according to claim 2, wherein the trailing end includes an overhang that juts out in a direction intersecting the central axis, and the biasing member applies the elastic force to the overhang.

5. The fluid discharge apparatus according to claim 4, wherein a face of the overhang that faces the coupling member includes a location in local contact with the coupling member.

6. The fluid discharge apparatus according to claim 5, wherein the overhang includes an abutting member projecting toward the coupling member from the face facing the coupling member, and the coupling member is in local contact with the overhang at the abutting member.

7. A fluid discharge apparatus comprising:

a storage chamber that stores a fluid and that includes a discharge port to discharge the fluid;

a moving body that includes a leading end facing the discharge port inside the storage chamber, the moving body reciprocally moving in directions away from the discharge port and toward the discharge port so as to cause the fluid to flow out through the discharge port;

a drive mechanism that is positioned on an opposite side of the moving body to the discharge port, the drive mechanism performing a first operation to physically pull the moving body so as to move the leading end away from the discharge port and a second operation to physically push the moving body so as to move the leading end toward the discharge port; and a coupling member that physically couples the moving body to the drive mechanism such that the moving body is attachable and detachable to the coupling member, the coupling member including a biasing member to apply an elastic force in a direction to move the moving body toward the drive mechanism, and wherein while the moving body is pressed against the coupling member, the coupling member supports the moving body in a state in which the moving body is configured to be elastically displaced in a direction toward the discharge port, wherein the leading end of the moving body is on a central axis of the moving body, and the moving body further includes a trailing end positioned on the central axis on an opposite side to the leading end, the biasing member applies an elastic force to the trailing end, and the coupling member retains the moving body in a state in which the leading end undergoes elastic displacement in a direction intersecting the central axis by elastic deformation of the biasing member, wherein the trailing end includes an overhang that juts out in a direction intersecting the central axis, and the biasing member applies the elastic force to the overhang, wherein a face of the overhang that faces the coupling member includes a location in local contact with the coupling member, wherein the overhang includes an abutting member projecting toward the coupling member from the face facing the coupling member, and the coupling member is in local contact with the overhang at the abutting member.

* * * * *